(12) United States Patent
Kipp et al.

(10) Patent No.: US 6,940,632 B1
(45) Date of Patent: Sep. 6, 2005

(54) MICROMECHANICAL STRUCTURE, IN PARTICULAR FOR AN ACCELERATION SENSOR

(75) Inventors: Andreas Kipp, Reutlingen (DE); Siegbert Goetz, Gerlingen (DE); Markus Lutz, Sunnyvale, CA (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/149,558

(22) PCT Filed: Nov. 11, 2000

(86) PCT No.: PCT/DE00/04015

§ 371 (c)(1),
(2), (4) Date: Dec. 26, 2002

(87) PCT Pub. No.: WO01/42797

PCT Pub. Date: Jun. 14, 2001

(30) Foreign Application Priority Data

Dec. 10, 1999 (DE) ............................. 199 59 707

(51) Int. Cl.[7] .......................................... G02B 26/00
(52) U.S. Cl. ..................................... 359/291; 73/488
(58) Field of Search ................. 359/290, 291, 359/292, 295, 298, 223, 224; 73/514.32, 73/862.337, 862.626, 514.35, 514.38, 488

(56) References Cited

U.S. PATENT DOCUMENTS

| 5,523,878 | A | * | 6/1996 | Wallace et al. .............. 359/290 |
| 5,565,625 | A | | 10/1996 | Howe et al. |
| 5,629,794 | A | * | 5/1997 | Magel et al. ................ 359/290 |
| 5,631,782 | A | * | 5/1997 | Smith et al. ................. 359/871 |
| 5,659,374 | A | * | 8/1997 | Gale et al. ................... 348/771 |
| 6,557,413 | B2 | * | 5/2003 | Nieminen et al. ............. 73/488 |

FOREIGN PATENT DOCUMENTS

DE          198 08 549          9/1999

* cited by examiner

*Primary Examiner*—Hung Xuan Dang
*Assistant Examiner*—Tuyen Tra
(74) *Attorney, Agent, or Firm*—Kenyon & Kenyon

(57) ABSTRACT

A micromechanical structure, particularly for an acceleration sensor, includes a substrate, which has an anchoring device, and a centrifugal mass, which is connected to the anchoring device via a flexible spring device, so that the centrifugal mass is elastically deflectable from its rest position. The centrifugal mass has an oblong convex form and is essentially rotationally symmetric in relation to the longitudinal axis. The centrifugal mass optionally has a widening at both longitudinal ends, to which the flexible spring device is attached.

5 Claims, 1 Drawing Sheet

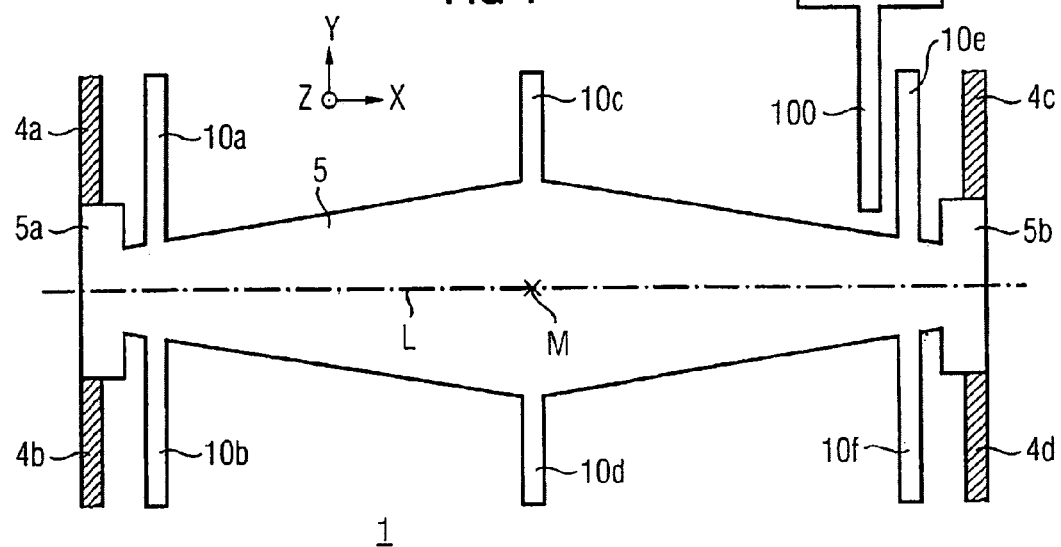
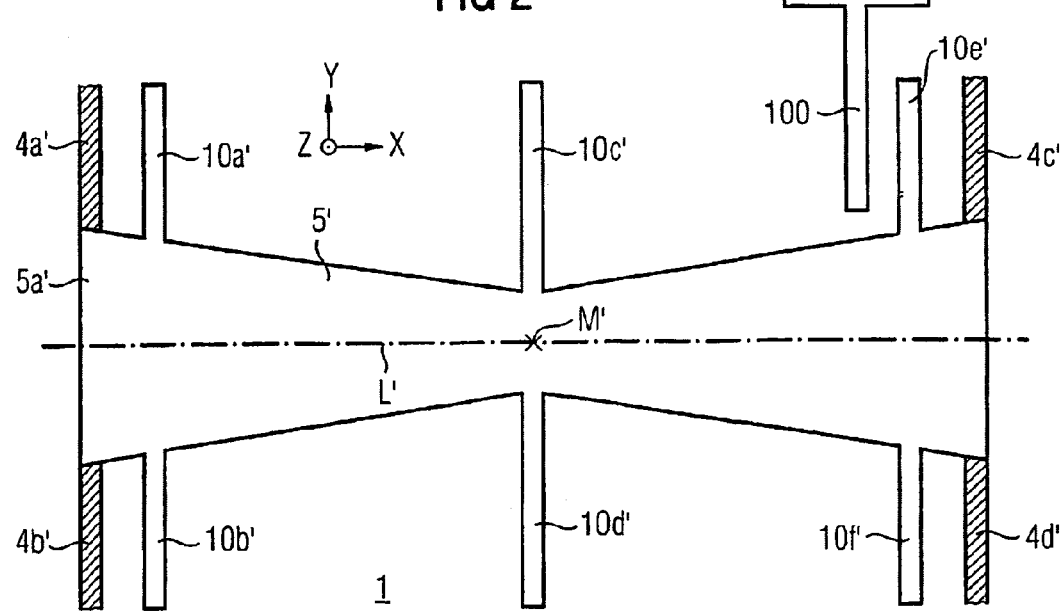

MICROMECHANICAL STRUCTURE, IN PARTICULAR FOR AN ACCELERATION SENSOR

FIELD OF THE INVENTION

The present invention relates to a micromechanical structure, particularly for an acceleration sensor, having a substrate, which has an anchoring device, and a centrifugal mass, which is connected to the anchoring device via a flexible spring device so that the centrifugal mass is elastically deflectable from its rest position. Although it may be usable on any desired micromechanical structures, the present invention and the problem on which it is based is described in relation to a micromechanical acceleration sensor.

BACKGROUND INFORMATION

FIG. 2 shows a schematic top view of a conventional micromechanical structure for an acceleration sensor, similar to the one described in German Published Patent Application No. 198 08 549. Such a structure may be, for example, used as a sensing element of a speed sensor.

In FIG. 2, 5' indicates a centrifugal mass which has a conical oblong shape having a longitudinal axis L'. In this case, M' is the longitudinal center point. Centrifugal mass 5' is elastically suspended over substrate 1 via an anchoring device (not shown) and flexible springs 4a' to d', so that centrifugal mass 5' is elastically deflectable from its rest position, i.e., it is a linear oscillator. 10a'–f' are electrodes which are movable together with centrifugal mass 5' and 100 is an electrode fixed rigidly in substrate 1. Each movable electrode 10a'–f' is assigned such a rigidly fixed electrode, however, only fixed electrode 100 is shown for the sake of simplicity.

Such micromechanical acceleration sensors may be configured as spring-mass systems. In general, centrifugal mass 5', springs 4a' to d', and electrodes 10a' to f' may be made of epitaxial polysilicon, which is made freely suspended by removing a sacrificial layer made of $SiO_2$ between the epitaxial polysilicon and the substrate.

The acceleration is detected capacitively via an appropriate capacitor, which has movable electrodes 10a' to f' as capacitor plates, which are attached to centrifugal mass 5', as well as fixed electrodes 100, which are anchored on substrate 1. Electrodes 10a' to f' attached to centrifugal mass 5' may have stepped lengths having different natural frequencies. The reason for this is that the natural frequencies of electrodes 10a' to f' are not to interfere with the response of the acceleration sensor.

Conventional shapes of centrifugal mass 5' are rectangles and the conical shape shown in FIG. 2. In the conventional approach shown in FIG. 2, the robustness of centrifugal mass 5' may be too low in regard to interfering influences acting orthogonally to longitudinal axis L'.

SUMMARY

The present invention may reduce the stress gradients, i.e., the sag of the centrifugal mass, by providing a convex shape of the centrifugal mass. In other words, the centrifugal mass may become narrower going from the center toward the longitudinal ends. A widening may be optionally provided at the connection to the springs.

In this manner, the transverse sensitivity, i.e., the susceptibility to transverse acceleration, may also be reduced. The desirable features of movable electrodes of differing lengths may be maintained, so that the danger of interference signal injection, conditioned by the natural frequencies of the electrodes, may be effectively counteracted. Furthermore, the present invention may increase processing/manufacturing reliability for the trench process, particularly for the flat trench process. At the same time, there may be no undesirable aspects in regard to further parameters.

According to an example embodiment, electrodes which are movable together with the centrifugal mass may be laterally attached thereto.

According to a further example embodiment, the length of the electrodes may increase going outward from the longitudinal center toward the longitudinal ends.

According to a further example embodiment, the length of the electrodes may be stepped in such a manner that the distance from the ends of the electrodes facing away from the centrifugal mass to the longitudinal axis may be constant. Due to this, the natural frequencies of the electrodes may not interfere with the response of the acceleration sensor.

According to a further example embodiment, the centrifugal mass may narrow uniformly going outward from the longitudinal center toward the longitudinal ends.

According to a further example embodiment, the widenings may be implemented in a stepped shape at the longitudinal ends.

According to a further example embodiment, the micromechanical structure according to the present invention may be producible by silicon surface micromechanics or another micromechanical technology.

BRIEF DESCRIPTION OF THE DRAWINGS

FIG. 1 is a schematic top view of an example embodiment of a micromechanical structure according to the present invention as part of an acceleration sensor.

FIG. 2 is a schematic top view of a conventional micromechanical structure for an acceleration sensor.

DETAILED DESCRIPTION

In the figures, identical reference numbers indicate identical or functionally identical components.

FIG. 1 is a schematic top view of an example embodiment of a micromechanical structure according to the present invention as part of an acceleration sensor.

In FIG. 1, in addition to the reference numbers already described, 5 indicates a centrifugal mass which has a convex oblong shape having a longitudinal axis L. In this case, M is the longitudinal center point. Centrifugal mass 5 is elastically suspended over substrate 1 via an anchoring device and flexible springs 4a to d, so that centrifugal mass 5 may be elastically deflectable out of its rest position around a rotational axis lying perpendicular to the substrate surface and around at least one rotational axis lying parallel to the substrate surface. 10a–f are electrodes which may be movable together with the centrifugal mass 5 and 100 is an electrode rigidly fixed in substrate 1. Each movable electrode 10a–f is assigned such a rigidly fixed electrode. However, only fixed electrode 100 is indicated for the sake of simplicity.

Centrifugal mass 5 of the acceleration sensor is configured as convex. In this manner, the acceleration sensor may be optimized in regard to the stress gradient and transverse sensitivity. Simultaneously, the stepped movable electrode arms may be maintained, so that the response of the spring-mass system is not impaired. The variables observed may be responsible for a change in capacitance during detection which may not originate from a rotational speed to be measured, but rather from a pathological, geometrically conditioned change in capacitance due to misalignment of the electrodes.

The use of an amplifier 5a, 5b on the longitudinal ends for connection to springs 4a to d may be provided in this case so that the convex geometry may have its full effect. This amplifier 5a, 5b may be implemented, as in the present exemplary embodiment, by a stepped widening. A continuous widening at the ends may also be provided.

In addition, the geometry of centrifugal mass 5 may allow the use of a thicker spring beam of springs 4a–d, without taking up additional chip area, while simultaneously lengthening the spring beam without changing the resonance frequency.

The beam width process parameter may have the greatest influence on the functionality of the acceleration sensor. In this case, the process window may be elevated with a widening. This may also produce an increase in the processing/manufacturing reliability for the trench process, particularly for the flat trench process.

The micromechanical acceleration sensor according to this example embodiment may be produced by silicon surface micromechanics.

Although the present invention is described above with reference to example embodiments, it may not be restricted to them, but may be modifiable in many aspects.

In particular, the geometry of the centrifugal mass and the flexible spring arrangement and the electrodes may not be restricted to the examples shown. However, larger deviations from the symmetrical form may be avoided if there is a danger that the linear parts of the external acceleration may invalidate the measurement result.

This production method is also only to be understood as an example, and other methods, such as electrical methods, may also be used to produce the acceleration sensor.

What is claimed is:

1. A micromechanical structure for an acceleration sensor, comprising:
    a substrate including an anchoring device;
    a centrifugal mass having a longitudinal center and longitudinal ends, the centrifugal mass essentially mirror symmetric in relation to a longitudinal axis and narrowing uniformly from the longitudinal center toward the longitudinal ends; and
    a flexible spring device, the centrifugal mass connected to the anchoring device via the flexible spring device so that the centrifugal mass is elastically deflectable from a rest position, wherein the centrifugal mass includes a widening at each of the longitudinal ends, to which the flexible spring device is attached.

2. A micromechanical structure for an acceleration sensor, comprising:
    a substrate including an anchoring device;
    a centrifugal mass having a longitudinal center and longitudinal ends, the centrifugal mass essentially mirror symmetric in relation to a longitudinal axis and narrowing uniformly from the longitudinal center toward the longitudinal ends;
    a flexible spring device, the centrifugal mass connected to the anchoring device via the flexible spring device so that the centrifugal mass is elastically deflectable from a rest position; and
    electrodes laterally attached to the centrifugal mass and movable together with the centrifugal mass, a length of the electrodes is configured to increase going outward from the longitudinal center toward the longitudinal ends.

3. The micromechanical structure according to claim 2, wherein the length of the electrodes is such that a distance from ends of the electrodes facing away from the centrifugal mass to the longitudinal axis is constant.

4. A micromechanical structure for an acceleration sensor, comprising:
    a substrate including an anchoring device;
    a centrifugal mass having a longitudinal center and longitudinal ends, the centrifugal mass essentially mirror symmetric in relation to a longitudinal axis and narrowing uniformly from the longitudinal center toward the longitudinal ends; and
    a flexible spring device, the centrifugal mass connected to the anchoring device via the flexible spring device so that the centrifugal mass is elastically deflectable from a rest position, wherein the centrifugal mass includes a widening at each of the longitudinal ends, to which the flexible spring device is attached, and wherein the widenings are arranged in a stepped shape at the longitudinal ends.

5. A micromechanical structure for an acceleration sensor, comprising:
    a substrate including an anchoring device;
    a centrifugal mass having a longitudinal center and longitudinal ends, the centrifugal mass essentially mirror symmetric in relation to a longitudinal axis and narrowing uniformly from the longitudinal center toward the longitudinal ends; and
    a flexible spring device, the centrifugal mass connected to the anchoring device via the flexible spring device so that the centrifugal mass is elastically deflectable from a rest position, wherein:
        the centrifugal mass includes a widening at each of the longitudinal ends, to which the flexible spring device is attached, and
        the flexible spring device includes a plurality of cantilevered springs.

* * * * *